(12) United States Patent
Grover

(10) Patent No.: US 8,080,070 B2
(45) Date of Patent: Dec. 20, 2011

(54) HYDROGENATION OF UNSATURATED HYDROCARBONS FOR SYNGAS PRODUCTION

(75) Inventor: Bhadra S. Grover, Sugar Land, TX (US)

(73) Assignee: Air Liquide Process & Construction, Inc., Houston, TX (US)

(*) Notice: Subject to any disclaimer, the term of this patent is extended or adjusted under 35 U.S.C. 154(b) by 418 days.

(21) Appl. No.: 12/429,224

(22) Filed: Apr. 24, 2009

(65) Prior Publication Data
US 2009/0265988 A1    Oct. 29, 2009

Related U.S. Application Data

(60) Provisional application No. 61/048,671, filed on Apr. 29, 2008.

(51) Int. Cl.
*C01B 3/02* (2006.01)
*C01B 3/22* (2006.01)
*C10J 3/00* (2006.01)

(52) U.S. Cl. ............... 48/197 R; 48/198.3; 48/DIG. 10; 423/650; 423/651; 423/655; 423/DIG. 5; 423/DIG. 6; 422/108; 422/111; 252/373

(58) Field of Classification Search ................ 252/373; 422/108, 111; 48/197 R, 198.3, DIG. 10; 423/650, 651, 655, DIG. 5, DIG. 6
See application file for complete search history.

(56) References Cited

U.S. PATENT DOCUMENTS

2009/0117024 A1* 5/2009 Weedon et al. ............ 423/437.1
2011/0062012 A1* 3/2011 Robinson ..................... 201/2.5
* cited by examiner

*Primary Examiner* — Timothy Vanoy
(74) *Attorney, Agent, or Firm* — Elwood L. Haynes

(57) ABSTRACT

A method of hydrogenation of unsaturated hydrocarbons for syngas production is presented. A hydrogenation feed reactor stream is introduced into a hydrogenation reactor, thereby producing a reformer feed stream. The reformer feed stream is introduced into a reformer, thereby producing a crude syngas stream. The crude syngas stream is introduced into a water gas shift converter, thereby producing a hydrogen-rich stream. The hydrogen-rich stream is separated in a separation means, thereby producing a carbon dioxide-rich stream and a hydrogen product stream. At least a portion of the hydrogen product stream is combined with a refinery fuel gas stream, and a natural gas stream, to form the hydrogenation reactor feed stream.

5 Claims, 1 Drawing Sheet

HYDROGENATION OF UNSATURATED HYDROCARBONS FOR SYNGAS PRODUCTION

CROSS-REFERENCE TO RELATED APPLICATIONS

Figure 1:
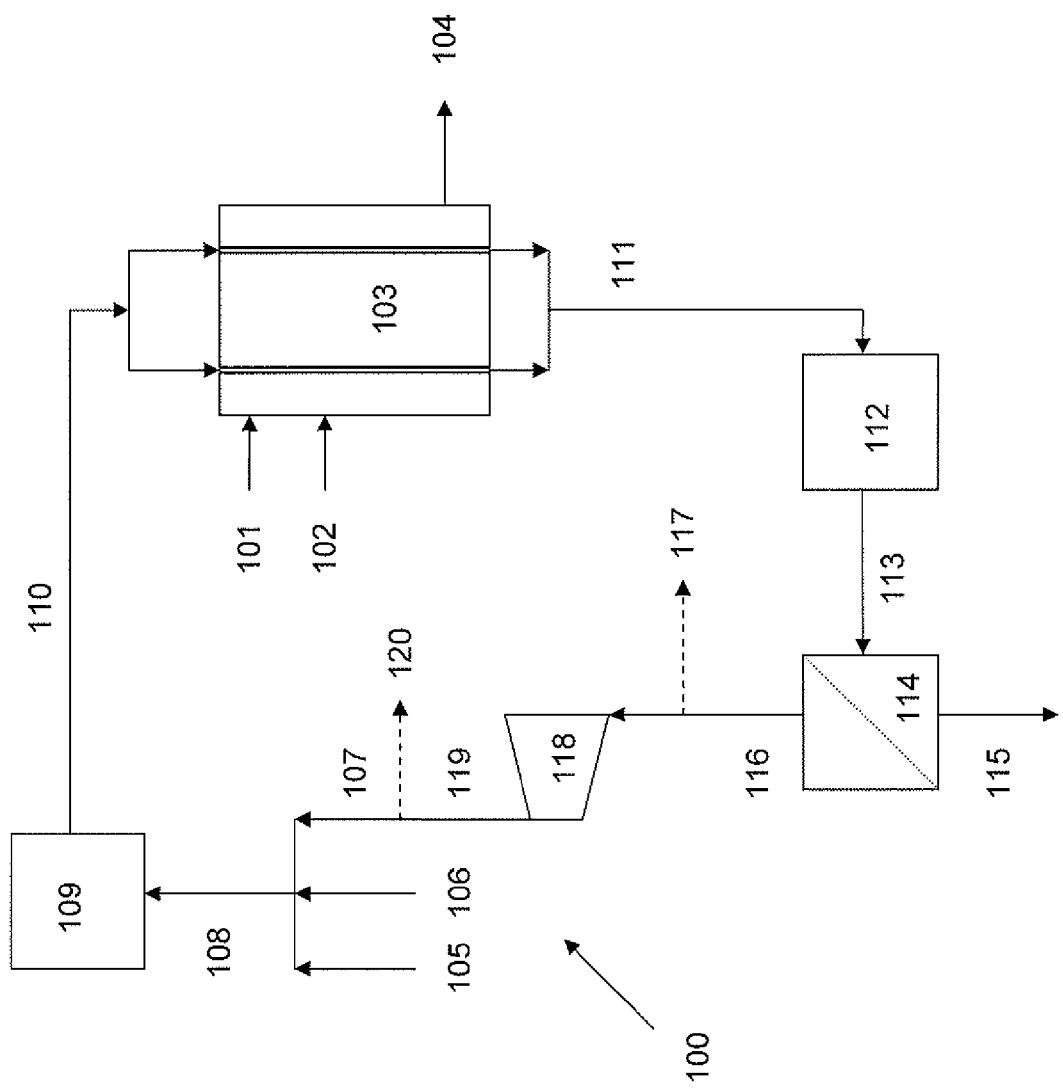

This application claims the benefit of U.S. Provisional Application No. 61/048,671, filed Apr. 29, 2008, the entire contents of which are incorporated herein by reference.

FIELD OF THE INVENTION

This invention relates to an improved method for using olefin containing feedstocks in a Steam Methane Reformer (SMR).

BACKGROUND

Refineries often use an available refinery fuel gas stream as part of the feedstock for an SMR, with the balance typically being natural gas. Some of these refinery fuel gas streams contain olefins such as ethylene, propylene, butenes, pantenes, etc. The concentration of the olefins in the fuel gas varies due to various changes in refinery operations. The concentration of the olefins in the feedstock can also increase if the natural gas feedstock is reduced relative to the refinery fuel gas stream.

Typically, these olefins are hydrogenated upstream of the SMR. The hydrogenation of olefins is an exothermic reaction. Due to the limitations on the hydrogenation catalyst, there is a limit on the allowable temperature rise within the hydrogenator. This limits the amount of olefins that may be allowable in the feed stream. This limit is typically between about 4% and about 6% by volume. For streams that contain higher concentrations of olefins, a recycle loop is usually used around the hydrogenator. This adds operational complexity, plus the capital and operating expenses relating to the addition of a recycle gas compressor and a recycle gas cooler.

SUMMARY

The present invention is a method of hydrogenation of unsaturated hydrocarbons for syngas production. This method includes introducing a hydrogenation reactor feed stream into a hydrogenation reactor, thereby producing a reformer feed stream. This method also includes introducing the reformer feed stream into a reformer, thereby producing a crude syngas stream. This method also includes introducing the crude syngas stream into a water gas shift converter, thereby producing a hydrogen-rich stream. This method also includes separating the hydrogen-rich stream in a separation means, thereby producing a carbon dioxide-rich stream and a hydrogen product stream. And this method includes combining at least a portion of the hydrogen product stream, a refinery fuel gas stream, and a natural gas stream, to form the hydrogenation reactor feed stream.

DESCRIPTION OF PREFERRED EMBODIMENTS

The invention may be understood by reference to the following description taken in conjunction with the accompanying drawings, and in which:

The sole FIGURE is a schematic representation of one embodiment of the present invention.

DESCRIPTION OF PREFERRED EMBODIMENTS

The present invention utilizes part of the product hydrogen stream to dilute the olefin content of the feedstock. The present invention eliminates the need for a recycle circuit around the hydrogenator. The amount of hydrogen that is used can be controlled based on the concentration of olefins in the feed gas or the temperature rise in the hydrogenator reactor.

Turning now to the sole FIGURE, system 100 is presented. Fuel stream 101 is introduced, with combustion oxidant stream 102, into the shell side of reformer 103, where they are combusted thereby providing the temperature and heat required for the reforming process. The products of this combustion exit the shell side of reformer 103 as exhaust stream 104. Refinery fuel gas stream 105, natural gas stream 106, and hydrogen product stream 107 are blended, thereby producing hydrogenation reactor feed stream 108. Hydrogenation reactor feed stream 108, is introduced into hydrogenation reactor 109, where it undergoes hydrogenation and exists as reformer feed stream 110. Reformer feed stream 110 is then introduced into the catalyst tubes of reformer unit 103.

Reformer feed stream 110 is converted into crude syngas stream 111. Crude syngas stream 111 is comprised primarily of hydrogen and carbon monoxide. Crude syngas stream 111 is then introduced into water gas shift reactor 112, thereby producing hydrogen rich stream 113. Hydrogen rich stream 113 is then introduced into separation means 114, where it is separated into carbon dioxide stream 115, and low pressure hydrogen product stream 116. Heat recovery from stream 111 and stream 113 is required, and can be done in many different ways. Separation means 114 may be a pressure swing adsorber, a membrane-type separator, or a cryogenic-type separator. Low pressure customer hydrogen stream 117, may consist of at least part of low pressure hydrogen product stream 116, and may be sent to customers. Low pressure hydrogen product stream 116, is then introduced into product compressor 117, where it exits as high pressure hydrogen product stream 119. High pressure customer hydrogen stream 120, may consist of at least part of high pressure hydrogen product stream 119, and may be sent to customers. At lest part of high pressure hydrogen product stream 119 becomes hydrogen product stream 107.

In one embodiment, a measurement means for the real time determination of the concentration of olefins in said refinery fuel gas stream is incorporated upstream of the mixing point, and the percentage of high pressure hydrogen product stream 119 that is combined with the natural gas stream 106 and the refinery fuel gas stream 105 is determined by the concentration of olefins in the refinery fuel gas stream 105. In another embodiment, a temperature measurement means for the real time determination of the temperature within hydrogenation reactor 103 is incorporated into hydrogenation reactor 103, and the portion of high pressure hydrogen product stream 119 that is combined with the natural gas stream 106 and the refinery fuel gas stream 105 is determined by the real time temperature within hydrogenation reactor 103.

It should be noted that one skilled in the art would recognize that alternative embodiments are also possible.

What is claimed is:

1. A method of hydrogenation of unsaturated hydrocarbons for syngas production, comprising;
    introducing a hydrogenation reactor feed stream into a hydrogenation reactor, thereby producing a reformer feed stream;

introducing said reformer feed stream into a reformer, thereby producing a crude syngas stream;

introducing said crude syngas stream into a water gas shift converter, thereby producing a hydrogen-rich stream;

separating said hydrogen-rich stream in a separation means, thereby producing a carbon dioxide-rich stream and a hydrogen product stream; and combining at least a portion of said hydrogen product stream, a refinery fuel gas stream, and a natural gas stream, to form said hydrogenation reactor feed stream.

2. The method of claim 1, further comprising a measurement means for the real time determination of the concentration of olefins in said refinery fuel gas stream, and wherein the portion of said hydrogen product stream that is combined with the natural gas stream and the refinery fuel gas stream is determined by the concentration of olefins in said refinery fuel gas stream.

3. The method of claim 1, further comprising a temperature measurement means for the real time determination of the temperature within the hydrogenation reactor, and wherein the portion of said hydrogen product stream that is combined with the natural gas stream and the refinery fuel gas stream is determined by the real time temperature within the hydrogenation reactor.

4. The method of claim 1, wherein said separation means is selected from the group consisting of a pressure swing adsorber, a membrane-type adsorber or a cryogenic-type separator.

5. The method of claim 1, wherein said separation means is a pressure swing adsorber.

* * * * *